(12) United States Patent
Kern (10) Patent No.: US 12,541,102 B2
(45) Date of Patent: Feb. 3, 2026

(54) OPTICAL WAVEGUIDE FOR A DISPLAY DEVICE

(71) Applicant: CONTINENTAL AUTOMOTIVE GMBH, Hannover (DE)

(72) Inventor: Thorsten Alexander Kern, Hamburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 1197 days.

(21) Appl. No.: 17/121,202

(22) Filed: Dec. 14, 2020

(65) Prior Publication Data

US 2021/0096364 A1    Apr. 1, 2021

Related U.S. Application Data

(63) Continuation of application No. PCT/EP2019/065498, filed on Jun. 13, 2019.

(30) Foreign Application Priority Data

Jun. 15, 2018   (DE) ............... 10 2018 209 622.8

(51) Int. Cl.
*G02B 27/01* (2006.01)
*B60K 35/10* (2024.01)
(Continued)

(52) U.S. Cl.
CPC .......... *G02B 27/0101* (2013.01); *B60K 35/10* (2024.01); *B60K 35/22* (2024.01);
(Continued)

(58) Field of Classification Search
CPC ... G02B 27/01–0189; G02B 2027/0105–0198; G02B 27/00–648; G02B 5/00–32; B60K 35/00–20
See application file for complete search history.

(56) References Cited

U.S. PATENT DOCUMENTS 4,693,544 A    9/1987    Yamasaki et al.
4,763,990 A    8/1988    Wood
(Continued)

FOREIGN PATENT DOCUMENTS

CN    101796377 A    8/2010
CN    203149234      8/2013
(Continued)

OTHER PUBLICATIONS

International Search Report and Written Opinion dated Sep. 12, 2019 from corresponding International Patent Application No. PCT/EP2019/065498.
(Continued)

*Primary Examiner* — Christopher A Lamb, II
(74) *Attorney, Agent, or Firm* — Buchanan Ingersoll & Rooney P.C.

(57) ABSTRACT

The disclosure relates to an optical waveguide for a display device and to a device for generating a virtual image using such an optical waveguide. The optical waveguide has two or more partial optical waveguides adapted to different wavelengths. At least one of the partial optical waveguides in this case has an optical filter. The optical filter is adapted to the wavelengths used.

4 Claims, 5 Drawing Sheets

(51) Int. Cl.
  *B60K 35/22* (2024.01)
  *B60K 35/231* (2024.01)
  *B60K 35/50* (2024.01)
  *B60K 35/55* (2024.01)
  *F21V 8/00* (2006.01)
  *G02B 5/20* (2006.01)
  *G02B 27/00* (2006.01)

(52) U.S. Cl.
  CPC ............ *B60K 35/231* (2024.01); *B60K 35/50* (2024.01); *B60K 35/55* (2024.01); *G02B 5/20* (2013.01); *G02B 6/0076* (2013.01); *G02B 27/0081* (2013.01); *B60K 2360/25* (2024.01); *B60K 2360/336* (2024.01); *G02B 2027/0112* (2013.01)

(56) References Cited

U.S. PATENT DOCUMENTS

| | | |
|---|---|---|
| 2004/0108971 A1 | 6/2004 | Waldern et al. |
| 2006/0126179 A1 | 6/2006 | Levola |
| 2010/0186500 A1 | 7/2010 | Rumpf |
| 2016/0077338 A1 | 3/2016 | Robbins et al. |
| 2016/0116739 A1 | 4/2016 | TeKolste et al. |
| 2016/0124223 A1 | 5/2016 | Shinbo et al. |
| 2016/0306169 A1 | 10/2016 | Nambara |
| 2017/0182888 A1 | 6/2017 | Banyay et al. |
| 2017/0235142 A1* | 8/2017 | Wall ............... G02B 5/26 359/633 |
| 2017/0307939 A1 | 10/2017 | Banin et al. |
| 2018/0039078 A1 | 2/2018 | Cai et al. |
| 2018/0180817 A1* | 6/2018 | Yeoh ............... G02B 6/0016 |
| 2019/0187465 A1* | 6/2019 | Erler ............... G02B 6/00 |

FOREIGN PATENT DOCUMENTS

| | | | |
|---|---|---|---|
| CN | 103777353 A | 5/2014 | |
| CN | 104020569 A | 9/2014 | |
| CN | 106338832 A | 1/2017 | |
| CN | 106716226 A | 5/2017 | |
| CN | 106796369 A | 5/2017 | |
| CN | 106932903 A | 7/2017 | |
| DE | 202014008103 U1 | 12/2014 | |
| DE | 102014214946 A1 | 2/2016 | |
| DE | 102016115938 A1 | 3/2018 | |
| GB | 2472444 A | 2/2011 | |
| JP | 2005234134 A | 9/2005 | |
| JP | 2008523434 A | 7/2008 | |
| JP | 2012058272 A | 3/2012 | |
| WO | 2017060665 A1 | 4/2017 | |
| WO | 2017120320 A1 | 7/2017 | |
| WO | WO-2018036834 A1 * | 3/2018 | ......... G02B 27/0081 |

OTHER PUBLICATIONS

Office Action dated Dec. 29, 2021 from corresponding Chinese patent application No. CN 201980038213.4.
Office Action dated Jan. 24, 2022 from corresponding Japanese patent application No. JP 2020-569814.
Decision of Rejection dated Sep. 16, 2022, in corresponding Chinese patent application No. 201980038213.4.
Office Action dated Mar. 27, 2023, in corresponding Chinese patent application No. 201980038213.4.
Notice of Allowance dated Jun. 7, 2023, in corresponding Chinese patent application No. 201980038213.4.
Lu Nan-Yan et al. "Application of CRT alternative Technology in Military Aircraft Head Up Display", Infrared and Laser Engineering, vol. 36, Supplement, China First Aviation Optoelectronics Institute, Oct. 2006, Article ID: 1007-2276 (2006) Add. A-0464-07.
Lu Nan-Yan et al. "Laser Projection for Head-up Displays: a New Technology for Image Generation" LINOS Photonics Gmbh & Co KG, A Member of the Qioptiq Group, 2010.

* cited by examiner

OPTICAL WAVEGUIDE FOR A DISPLAY DEVICE

CROSS-REFERENCE TO RELATED APPLICATIONS

This application claims the benefit of International Application PCT/EP2019/065498, filed Jun. 13, 2019, which claims priority to German Application DE 10 2018 209 622.8, filed Jun. 15, 2018. The disclosures of the above applications are incorporated herein by reference.

TECHNICAL FIELD

The disclosure relates to an optical waveguide for a display device and to a device for generating a virtual image using such an optical waveguide.

BACKGROUND

A head-up display, also referred to as a HUD, is understood to mean a display system in which the viewer can maintain their viewing direction, since the contents to be represented are superposed into their field of view. While such systems were originally primarily used in the aerospace sector due to their complexity and cost, they are now also being used in large-scale production in the automotive sector.

Head-up displays generally consist of an image generator, an optics unit, and a mirror unit. The image generator produces the image. The optics unit directs the image onto the mirror unit. The image generator is often also referred to as an image-generating unit or PGU (Picture Generating Unit). The mirror unit is a partially reflective, light-transmissive pane. The viewer thus sees the contents represented by the image generator as a virtual image and at the same time sees the real world behind the pane. In the automotive sector, the windshield is often used as the mirror unit, and the curved shape of the windshield must be taken into account in the representation. Due to the interaction of the optics unit and the mirror unit, the virtual image is an enlarged representation of the image produced by the image generator.

The viewer may view the virtual image only from the position of what is known as the eyebox. A region whose height and width correspond to a theoretical viewing window is called an eyebox. As long as one eye of the viewer is within the eyebox, all elements of the virtual image are visible to that eye. If, on the other hand, the eye is outside the eyebox, the virtual image is only partially visible to the viewer, or not at all. The larger the eyebox is, the less restricted the viewer is in choosing their seating position.

The size of the virtual image of conventional head-up displays is limited by the size of the optics unit. One approach for enlarging the virtual image is to couple the light coming from the image-generating unit into an optical waveguide. The light that is coupled into the optical waveguide and carries the image information undergoes total internal reflection at the interfaces thereof and is thus guided within the optical waveguide. In addition, a portion of the light is in each case coupled out at a multiplicity of positions along the propagation direction, so that the image information is output distributed over the surface of the optical waveguide. Owing to the optical waveguide, the exit pupil is in this way expanded. The effective exit pupil is composed here of images of the aperture of the image generation system.

Against this background, US 2016/0124223 A1 describes a display apparatus for virtual images. The display apparatus includes an optical waveguide that causes light that is coming from an image-generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface that extends in the first direction. The display apparatus further includes a first light-incidence-side diffraction grating that diffracts incident light to cause the diffracted light to enter the optical waveguide, and a first light-emergent diffraction grating that diffracts the light that is incident from the optical waveguide.

The optical waveguide used in US 2016/0124223 A1 is optimized for one light wavelength. If a colored virtual image is to be represented, two or more partial optical waveguides that are each wavelength-optimized are to be provided. One partial optical waveguide is usually assigned here to each color. However, two colors may also be transported combined in one partial optical waveguide. The partial optical waveguides are illuminated by light sources in the respective associated color. In head-up displays based on holographic optical waveguides, in addition to the useful light, the specular and holographic reflections of the sun are also reflected at the glass plates of the respective partial optical waveguides via the mirror unit to the eye. As a rule, this leads to at least an impairment of the image perception, and often even to direct, safety-relevant dazzling of the user of the system.

SUMMARY

The disclosure provides an optical waveguide and a device for generating a virtual image, in which the risk of being dazzled by stray light is reduced.

According to a first aspect of the disclosure, an optical waveguide for a display device includes two or more partial optical waveguides adapted to different wavelengths, where at least one of the partial optical waveguides has an optical filter.

According to a further aspect of the disclosure, a device for generating a virtual image includes an image-generating unit for producing an image; an optics unit for projecting the image onto a mirror unit for generating the virtual image; and an optical waveguide for expanding an exit pupil.

When using laser light, only very narrowband spectra are used for the supported wavelengths of the light sources. By using a suitable optical filter that is adapted to the wavelengths used, it is ensured that only these narrowband wavelength ranges of the stray light can penetrate as far as the partial optical waveguides. This significantly reduces the proportion of the potentially reflected sunlight, since only those components of the sunlight whose wavelengths lie in the transmission range of the optical filter can enter the partial optical waveguide. In this way, a reduction in the back reflection to the minimum of the transparency of the optical filter required in transmission is achieved.

The optical waveguide according to the disclosure makes it possible to implement head-up displays that exhibit reduced glare due to stray light. The use is therefore particularly advantageous in head-up displays that are used in an environment in which there is the possibility of sunlight being coupled into the optical waveguide. This is the case, for example, when used in a motor vehicle.

According to one aspect of the disclosure, the optical filter is a dielectric filter. Dielectric filters have the advantage that the transmission properties can be set very precisely and very narrowband transmission bands can be realized. At the same time, there are numerous suitable dielectric filters available on the market that can be used without any effort in terms of development.

According to one aspect of the disclosure, the optical waveguide has three partial optical waveguides for three associated wavelengths. In this way, the optical waveguide can be used for displaying multicolored virtual images. For example, the partial optical waveguides can be optimized for the colors red, green, and blue, with which full-color images can be represented. A person skilled in the art is familiar with further color combinations with which full-color images can be realized.

According to one aspect of the disclosure, a first partial optical waveguide has an optical filter that is transmissive to the three wavelengths. A second partial optical waveguide has an optical filter that is transmissive to two of the three wavelengths. Finally, a third partial optical waveguide has an optical filter that is transmissive to one of the three wavelengths. According to this example, there is an optical filter present for each partial optical waveguide. The first partial optical waveguide viewed from the stray light source has on the upper side a first optical filter that transmits all three colors, while the second optical filter of the subsequent partial optical waveguide is transmissive only to two colors. The third optical filter of the third partial optical waveguide transmits only one color. In this way, the proportion of potentially reflected sunlight can be further reduced.

According to one aspect of the disclosure, the partial optical waveguides have a two-dimensional design and form a stack. Due to the two-dimensional design of the partial optical waveguides, the optical waveguide can be used to expand an exit pupil into two dimensions. The integration of the partial optical waveguides into a stack in this case simplifies handling and adjustment during the assembly of a head-up display. At the same time, greater stability of the optical waveguide is thus achieved, which is particularly important for head-up displays that are exposed to the effects of external forces, for example due to vibrations that occur while driving in a motor vehicle.

According to one aspect of the disclosure, at least one optical filter is integrated into the stack. By integrating the optical filter into the stack, it is protected to a certain extent against external influences. With this design, it is additionally possible for the optical waveguide to be installed together with the optical filter in the head-up display in a single production step, which reduces the production time.

According to one aspect of the disclosure, the optical filter is applied onto an interface of a partial optical waveguide. In this way, further reflections in the stack can be avoided and the amount of energy transported by the stray light that is incident on the sum of all interfaces can be minimized.

According to one aspect of the disclosure, the optical filter is applied onto an interface of a partial optical waveguide by vapor deposition or sputtering. The desired optical filter can be produced very cost-effectively by vapor deposition, that is to say by vapor deposition of layers. The application of the optical filter by sputtering, also referred to as cathode sputtering, is less cost-effective but particularly suitable for complex filters with high demands in terms of accuracy.

A device according to the disclosure for generating a virtual image may be used in a means of transport in order to produce a virtual image for an operator of the means of transport. The means of transport can be, for example, a motor vehicle or an aircraft. Of course, the solution according to the disclosure can also be used in other environments or for other applications, e.g. in trucks, in rail technology, and in public transport, in cranes and construction machinery, etc.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The concept of a head-up display with an optical waveguide will be explained with reference to FIGS. 1 to 4.

Figure 1:
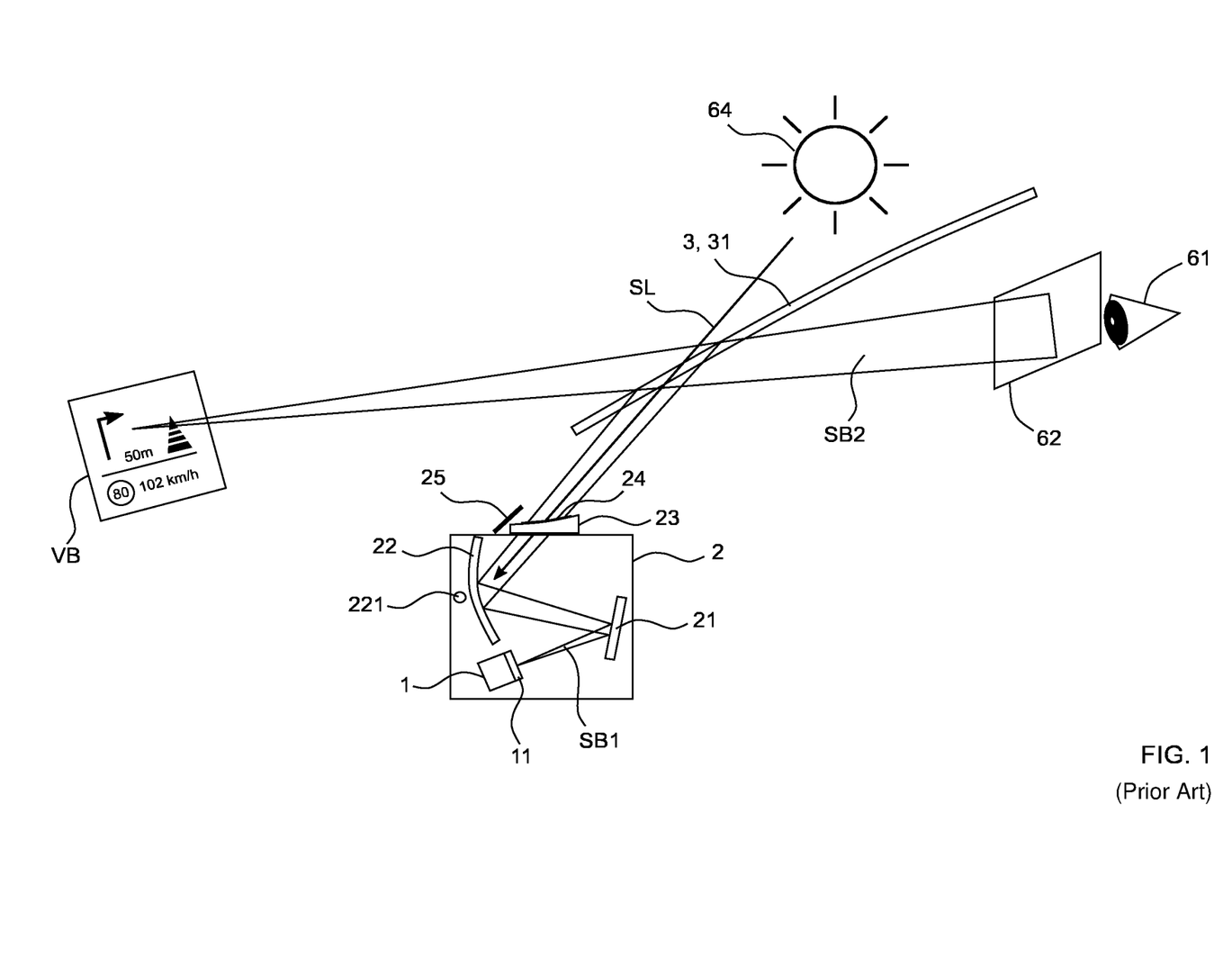
FIG. 1 schematically shows a head-up display according to the prior art for a motor vehicle.

FIG. 1 shows a schematic diagram of a head-up display according to the prior art for a motor vehicle. The head-up display has an image generator 1, an optics unit 2, and a mirror unit 3. A beam bundle SB1 emanates from a display element 11 and is reflected by a folding mirror 21 onto a curved mirror 22 that reflects it in the direction of the mirror unit 3. The mirror unit 3 is illustrated here as a windshield 31 of a motor vehicle. From there, the beam bundle SB2 travels in the direction of an eye 61 of a viewer.

The viewer sees a virtual image VB that is located outside the motor vehicle above the engine hood or even in front of the motor vehicle. Due to the interaction of the optics unit 2 and the mirror unit 3, the virtual image VB is an enlarged representation of the image displayed by the display element 11. A speed limit, the current vehicle speed, and navigation instructions are symbolically represented here. As long as the eye 61 is located within the eyebox 62 indicated by a rectangle, all elements of the virtual image are visible to that eye 61. If the eye 61 is outside the eyebox 62, the virtual image VB is only partially visible to the viewer, or not at all. The larger the eyebox 62 is, the less restricted the viewer is when choosing their seating position.

The curvature of the curved mirror 22 is adapted to the curvature of the windshield 31 and ensures that the image distortion is stable over the entire eyebox 62. The curved mirror 22 is rotatably mounted by a bearing 221. The rotation of the curved mirror 22 that is made possible thereby makes it possible to displace the eyebox 62 and thus to adapt the position of the eyebox 62 to the position of the eye 61. The folding mirror 21 serves to ensure that the path traveled by the beam bundle SB1 between the display element 11 and the curved mirror 22 is long and, at the same time, that the optics unit 2 is nevertheless compact. The optics unit 2 is delimited with respect to the environment by a transparent cover 23. The optical elements of the optics unit 2 are thus protected for example against dust located in the interior of the vehicle. An optical film or a polarizer 24 is furthermore located on the cover 23. The display element 11 is typically polarized, and the mirror unit 3 acts like an analyzer. The purpose of the polarizer 24 is therefore to influence the polarization in order to achieve uniform visibility of the useful light. An anti-glare protection 25 serves to reliably absorb the light reflected via the interface of the cover 23 so that the observer is not dazzled. In addition to the sunlight SL, the light from another stray light source 64 can also reach the display element 11. In combination with a polarization filter, the polarizer 24 can additionally be used to block out incident sunlight SL.

Figure 2:
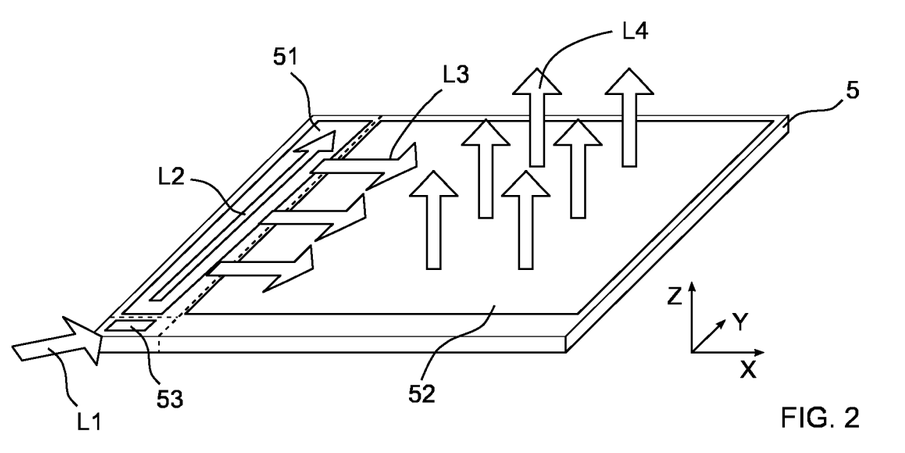
FIG. 2 shows an optical waveguide with two-dimensional enlargement.

FIG. 2 shows a schematic spatial illustration of an optical waveguide 5 with two-dimensional enlargement. In the lower left region, an input coupling hologram 53 can be seen, by means of which light L1 coming from an image-generating unit (not shown) is coupled into the optical waveguide 5. The light propagates therein in the drawing to the top right, according to the arrow L2. In this region of the optical waveguide 5, a folding hologram 51 that acts similarly to many partially transmissive mirrors arranged one behind the other and produces a light bundle that is expanded in the Y-direction and propagates in the X-direction is located. This is indicated by three arrows L3. In the part of the optical waveguide 5 that extends to the right in the figure, an output coupling hologram 52 is located, which likewise acts similarly to many partially transmissive mirrors arranged one behind the other and, indicated by arrows L4, couples light upward in the Z-direction out of the optical waveguide 5. In this case, an expansion takes place in the X-direction, so that the original incident light bundle L1 leaves the optical waveguide 5 as a light bundle L4 that is enlarged in two dimensions.

Figure 3:
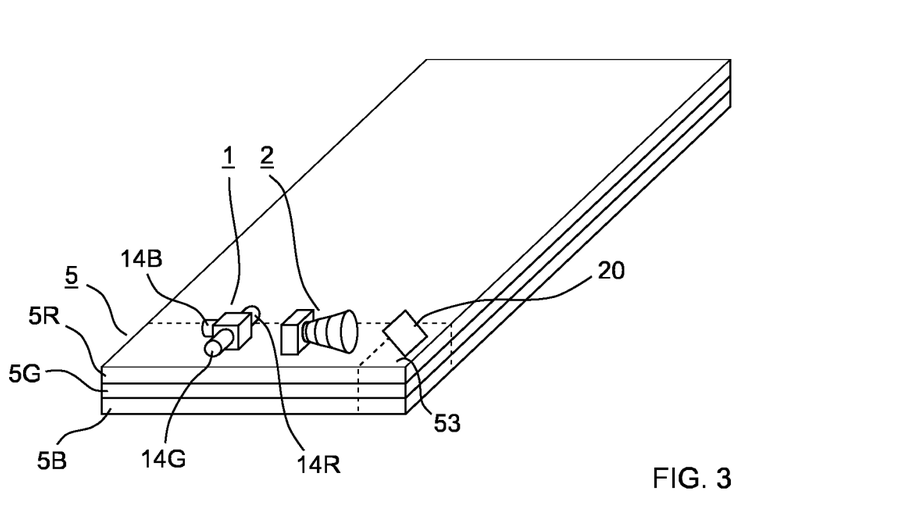
FIG. 3 schematically shows a head-up display with an optical waveguide.

FIG. 3 shows a three-dimensional illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguide 5 are each wavelength-dependent, meaning that one optical waveguide 5R, 5G, 5B is used in each case for one of the elementary colors. An image generator 1 and an optics unit 2 are shown above the optical waveguide 5. The optics unit 2 has a mirror 20, by means of which the light produced by the image generator 1 and shaped by the optics unit 2 is deflected in the direction of the respective input coupling hologram 53. The image generator 1 has three light sources 14R, 14G, 14B for the three elementary colors. It can be seen that the entire unit shown has a small overall structural height compared to its light-emitting surface.

Figure 4:
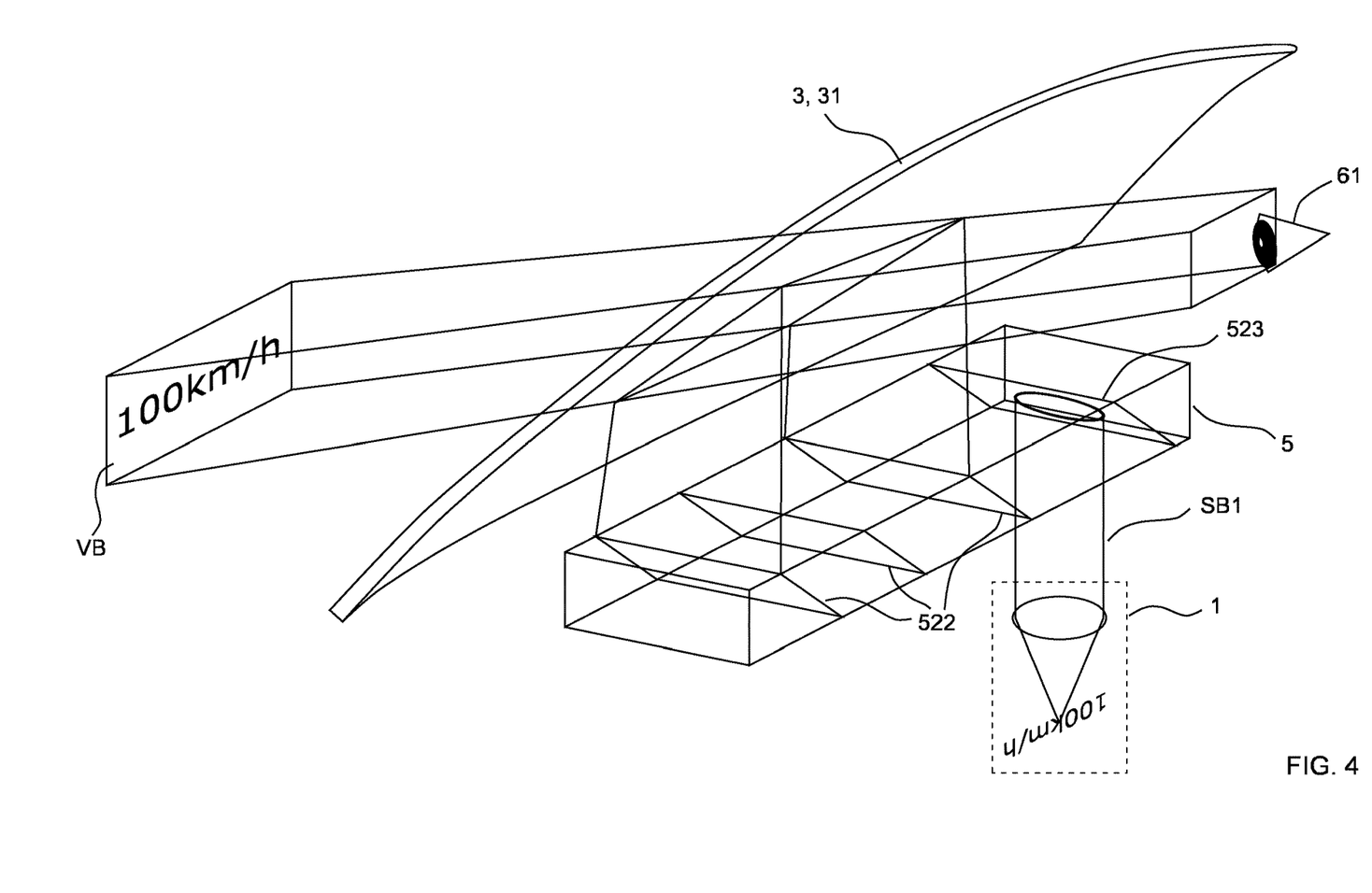
FIG. 4 schematically shows a head-up display with an optical waveguide in a motor vehicle.

FIG. 4 shows a head-up display in a motor vehicle similar to FIG. 1, except here in a three-dimensional illustration and with an optical waveguide 5. It shows the schematically indicated image generator 1, which produces a parallel beam bundle SB1 that is coupled into the optical waveguide 5 by the mirror plane 523. The optics unit is not shown for the sake of simplicity. A plurality of mirror planes 522 each reflect a portion of the light incident on them in the direction of the windshield 31, the mirror unit 3. The light is reflected thereby in the direction of the eye 61. The viewer sees a virtual image VB above the engine hood or at an even farther distance in front of the motor vehicle. With this technology, too, the entire optical unit is incorporated in a housing that is separated with respect to the environment by a transparent cover. As with the head-up display from FIG. 1, a retarder can be arranged on this cover.

Figure 5:
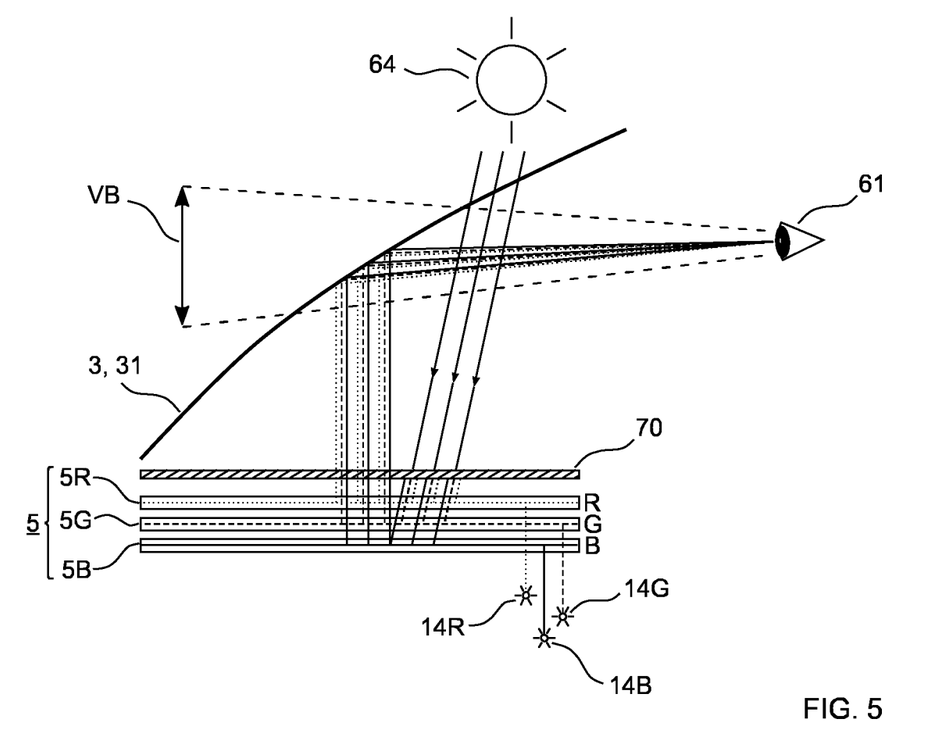
FIG. 5 illustrates the incidence of stray light into an optical waveguide according to the disclosure with an optical filter.
Figure 6:
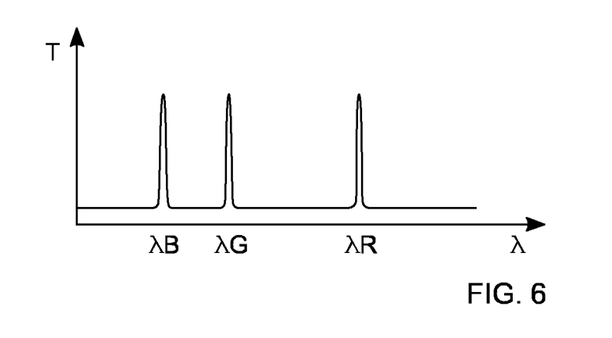
FIG. 6 schematically shows the transmission curve of the optical filter from FIG. 5.

FIG. 5 illustrates the incidence of stray light into an optical waveguide 5 according to the disclosure with an optical filter 70. FIG. 6 schematically shows the transmission curve of the optical filter 70. The optical waveguide 5 is a constituent part of a device for generating a virtual image VB for a viewer 61. In this example, the device is a head-up display of a motor vehicle. The optical waveguide 5 is used here for the two-dimensional expansion of an exit pupil. The windshield 31 of the motor vehicle acts as the mirror unit 3. The stray light source 64 is the sun in this case.

In some examples, as shown, the optical waveguide 5 has three partial optical waveguides 5R, 5G, 5B optimized for different wavelengths $\lambda R$, $\lambda G$, $\lambda B$. The wavelengths preferably correspond to the colors red, green, and blue. The uppermost partial optical waveguide 5R in FIG. 5 has an optical filter 70, for example a dielectric filter. As can be seen from the schematic transmission curve in FIG. 6, in which the transmission coefficient T is plotted over the wavelength $\lambda$, the optical filter 70 has three narrowband transmission bands that correspond to the three wavelengths $\lambda R$, $\lambda G$, $\lambda B$ used. The partial optical waveguides 5R, 5G, 5B are illuminated by light sources 14R, 14G, 14B, which each emit the associated colors. When using laser light, only very narrowband spectra are available for the supported wavelengths $\lambda R$, $\lambda G$, $\lambda B$ of the light sources 14R, 14G, 14B.

In head-up displays based on holographic optical waveguides 5, in addition to the useful light, the specular and holographic reflections of the sun are also reflected as the stray light source 64 at the glass plates of the respective partial optical waveguides 5R, 5G, 5B via the mirror unit 3 to the eye 61. As a rule, this leads to at least an impairment of the image perception, and often even to direct, safety-relevant dazzling of the user of the system. The use of the optical filter 70 ensures that only the narrowband regions of the stray light can penetrate as far as the partial optical waveguides 5R, 5G, 5B. This significantly reduces the proportion of the potentially reflected sunlight.

Figure 7:
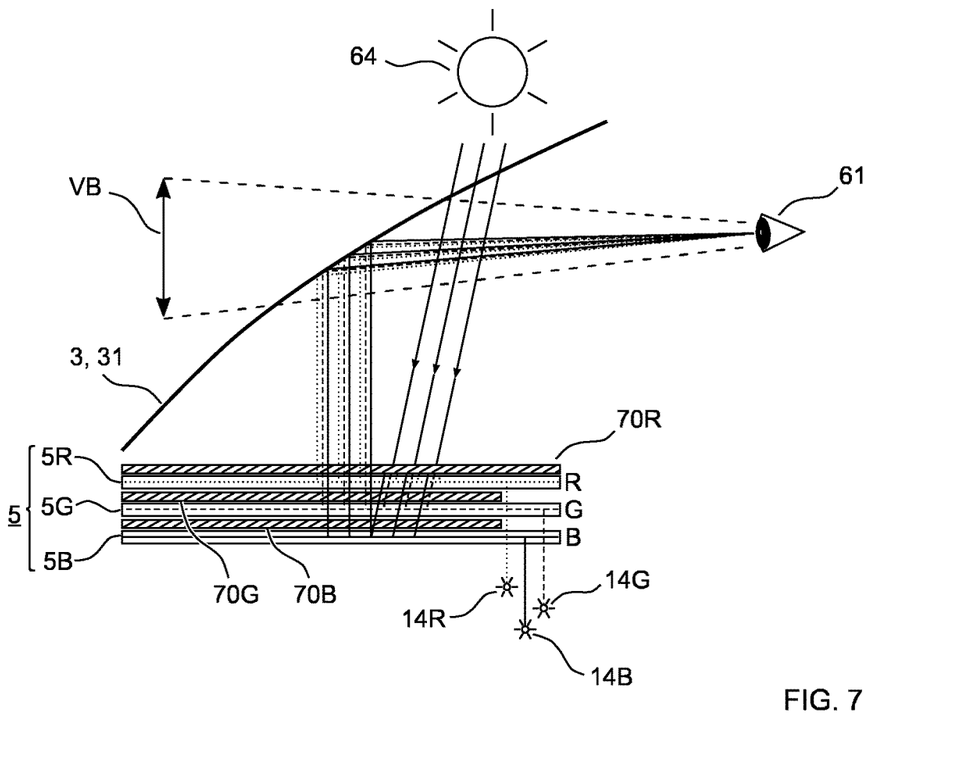
FIG. 7 illustrates the incidence of stray light into an optical waveguide according to the disclosure with three optical filters.
Figure 8:
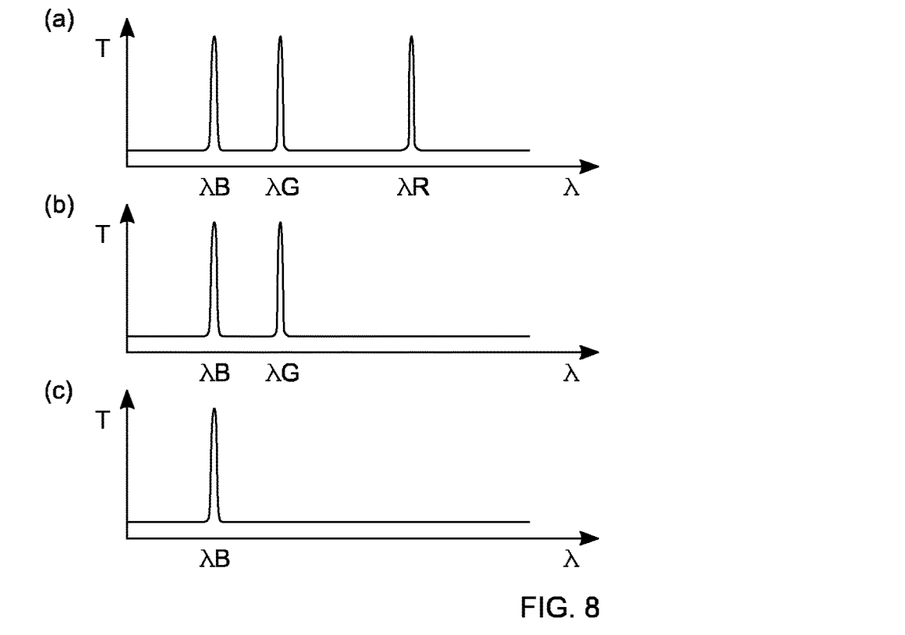
FIG. 8 schematically shows the transmission curves of the optical filters from FIG. 7.

FIG. 7 illustrates the incidence of stray light into an optical waveguide 5 according to the disclosure with three optical filters 70R, 70G, 70B. FIG. 8 schematically shows the transmission curves of the optical filters 70R, 70G, 70B. Partial image (a) shows the transmission curve of the first optical filter 70R viewed from the stray light source 64, partial image (b) shows the transmission curve of the second optical filter 70G, and partial image (c) shows the transmission curve of the third optical filter 70G. As in FIG. 6, the transmission coefficient T is plotted over the wavelength $\lambda$ in the transmission curves.

In this variant, one optical filter 70R, 70G, 70B is provided for each partial optical waveguide 5R, 5G, 5B. The first partial optical waveguide 5R viewed from the stray light source 64 has on the upper side a first optical filter 70R that transmits all three colors, while the second optical filter 70G of the subsequent partial optical waveguide 5G is transmissive only to two colors. The third optical filter 70B of the third partial optical waveguide 5B transmits only one color. Depending on the possibility of the production process, these optical filters 70R, 70G, 70B can also be applied directly onto the interfaces of the partial optical waveguides 5R, 5G, 5B in order to avoid further reflections and to minimize the amount of energy incident on the sum of all interfaces.

A number of implementations have been described. Nevertheless, it will be understood that various modifications may be made without departing from the spirit and scope of the disclosure. Accordingly, other implementations are within the scope of the following claims.

LIST OF REFERENCE SIGNS

1 Image generator/image-generating unit
11 Display element
14, 14R, 14G, 14B Light source
2 Optics unit
20 Mirror
21 Folding mirror
22 Curved mirror
221 Bearing
23 Transparent cover
24 Optical film/polarizer
25 Anti-glare protection
3 Mirror unit
31 Windshield
5, 5R, 5G, 5B Optical waveguide
51 Folding hologram
52 Output coupling hologram
522 Mirror plane
523 Mirror plane
53 Input coupling hologram
54 Substrate
55 Cover layer
56 Hologram layer
61 Eye/viewer
62 Eyebox
64 Stray light source
70, 70R, 70G, 70B Optical filter
L1 . . . L4 Light
$\lambda$, $\lambda R$, $\lambda G$, $\lambda B$ Wavelength
S1 Receiving an image to be displayed
S2 Determining regions without image contents to be represented
S3 Switching the electrode array according to the specific regions
SB1, SB2 Beam bundles
SL Sunlight
T Transmission coefficient
VB Virtual image

What is claimed is:

1. An optical waveguide comprising:
a first optical waveguide adapted to transmit light of a first wavelength;
a second optical waveguide adapted to transmit light of a second wavelength;
a third optical waveguide adapted to transmit light of a third wavelength; and
an optical filter having three narrowband transmission bands corresponding to the first wavelength, the second wavelength, and the third wavelength.

2. The optical waveguide as claimed in claim 1, wherein the optical filter is a dielectric filter, and
wherein the light of the first wavelength is red light, the light of the second wavelength is green light, and the light of the third wavelength is blue light.

3. A device for generating a virtual image, the device comprising:
an image-generating unit for producing an image; and
an optics unit for projecting the image onto a mirror unit for generating the virtual image; and
an optical waveguide for expanding an exit pupil, the optical waveguide comprising:
a first optical waveguide adapted to transmit light of a first wavelength;
a second optical waveguide adapted to transmit light of a second wavelength;
a third optical waveguide adapted to transmit light of a third wavelength; and
an optical filter having three narrowband transmission bands corresponding to the first wavelength, the second wavelength, and the third wavelength.

4. The device as claimed in claim 3, wherein the optical filter is a dielectric filter, and
wherein the light of the first wavelength is red light, the light of the second wavelength is green light, and the light of the third wavelength is blue light.

* * * * *